(12) United States Patent
Shim (10) Patent No.: US 8,632,205 B2
(45) Date of Patent: Jan. 21, 2014

(54) LED LIGHTING MODULE USING AC POWER

(76) Inventor: Hyun-Seop Shim, Seoul (KR)

( * ) Notice: Subject to any disclaimer, the term of this patent is extended or adjusted under 35 U.S.C. 154(b) by 437 days.

(21) Appl. No.: 12/988,736

(22) PCT Filed: May 1, 2009

(86) PCT No.: PCT/KR2009/002325
§ 371 (c)(1),
(2), (4) Date: Oct. 20, 2010

(87) PCT Pub. No.: WO2009/139550
PCT Pub. Date: Nov. 19, 2009

(65) Prior Publication Data
US 2011/0043135 A1 Feb. 24, 2011

(30) Foreign Application Priority Data

May 10, 2008 (KR) .................. 10-2008-0043688

(51) Int. Cl.
*F21L 4/00* (2006.01)
(52) U.S. Cl.
USPC ... 362/197; 362/198; 362/217.16; 362/217.1; 315/246
(58) Field of Classification Search
USPC .......... 315/294; 362/231, 236, 276, 177, 192, 362/197–199, 217.12, 217.16, 232, 249.01, 362/249.07, 249.11, 365, 368
See application file for complete search history.

(56) References Cited

U.S. PATENT DOCUMENTS 7,387,405 B2 * 6/2008 Ducharme et al. ............ 362/231
8,093,823 B1 * 1/2012 Ivey et al. ..................... 315/246

OTHER PUBLICATIONS

Carclo Technical Plastics, "0.8mm Offset Focus 20mm Dia Optic", Aug. 2006, revision 1, URL: http://www.carclo-optics.com/.*

* cited by examiner

*Primary Examiner* — Jerome Jackson, Jr.
*Assistant Examiner* — Borna Alaeddini
(74) *Attorney, Agent, or Firm* — Galgano & Associates, PLLC; Thomas M. Galgano; Jessica G. Bower (57) ABSTRACT

The present invention relates to an LED lighting module using AC power, where an AC-driven LED lighting is implemented by a simplified rectifier circuit and by adjusting the number of LED elements, without using a dedicated circuit configuration such as SMPS, and the LED modules are arranged in a way to enable a multiplicity of unit modules to be driven with a single power supply. The LED lighting module using AC power contains a power supply which receives AC power; unit modules, each having at least two LED sets connected together, each having one LED element or plural interconnected LED elements driven by an input power; and rectifier circuits, each being separately installed to which the power is input, for rectifying AC power which is input through the power supply when a multiplicity of unit modules form a loop.

5 Claims, 6 Drawing Sheets

LED LIGHTING MODULE USING AC POWER

TECHNICAL FIELD

The present invention relates to a LED lighting module using an AC power.

More particularly, the present invention relates to a LED lighting module using an AC power, wherein an AC-driven LED lighting is implemented by a simplified rectifier circuit and by adjusting the number of LED elements, without using a dedicated circuit configuration such as SMPS or the like, and the LED modules are arranged in a way to enable a multiplicity of unit modules to be driven with a single power supply. Therefore, in application of such LED modules as indoor and outdoor advertising lights, the simplified rectification structure makes it possible to attain reduced manufacturing costs and smaller-size products and to save more energy at the same time, and the supply of a constant current to the LED lighting module all the time helps the module to be driven more stably.

Also, the present invention relates to an AC-powered LED lighting system capable of efficiently emitting the light at a maximally enlarged angle in view of an application purpose and a structural situation and so on, when the LED module is applied to a channel sign, an indoor lamp, an outdoor lamp or an interior lamp etc.

BACKGROUND ART

In general, as an indoor lighting inside the building, the fluorescent lamp or halogen lamp is typically installed on the ceiling or wall. However, such a fluorescent lamp or halogen lamp still consumes lots of power compared with the general indoor illuminating lamp, mainly providing illumination in a single color. In order to solve the drawbacks of high power consumption and monotony of the illumination as such, an LED illuminating lamp which can produce lighting in various colors with less power consumption than the fluorescent lamp or halogen lamp has been manufactured and sold in the market.

In the illuminating device as the above, a plurality of LED modules mounted with plural LEDs is placed in a particular arrangement, and the LED modules are installed on the ceiling, the wall surface or the like of an indoor space. Specifically, the LED module (or illuminating lamp) is provided with an A/D converter to convert the AC power inputted from the outside into the DC power as the LED has characteristics of being driven by a direct current with a proper voltage. At this point, the A/D converter is accompanied by a transformer circuit having a trans-coil to lower the voltage of an alternate current, and the transformer circuit has drawbacks in that since the transformer circuit is arranged occupying a large space in the LED module, the dimension of the product having the same becomes large.

In order to solve the problems as described above, a power supply device called SMPS (Switching Mode Power Supply) has been recently applied to a small illuminating device employed with the LEDs. The SMPS is designed to transform the frequency of the AC power into a high frequency of the DC power, which can embody a much more miniaturized and lighter converting circuit than that of the conventional transformer.

Meanwhile, in order to apply the lighting device to an indoor or outdoor advertising lamp, in a status that the plural RGB LEDs is a unit module, the plurality of the unit modules is connected to each other and is placed in the form of a desired advertising lamp to embody the RGB LED module.

It is well known that the LED module includes LEDs for emitting light having specific colors through the supply of electric power and signal and a circuit construction for processing the inputted power and signal. Such LED module is actively applied to a channel sign, an indoor lamp, an outdoor lamp or an interior lamp etc so as to advertise the specific enterprises etc.

More concretely, the plurality of the LED modules is fixed and arranged on the inside of the sign structure having specific characters or drawings etc., so that the sign can be easily observed through the irradiation of the specific light inside the sign structure and specifically, the superior beauty of the sign can be maintained.

Disclosure

Technical Problem

The SMPS can embody a much more miniaturized and lighter converting circuit than that of the conventional transformer. Meanwhile, there are also problems in that since the SMPS in the LED illuminating lamp transforms the AC power of 220V into the DC power of 12V to 24V, it requires a considerably large amount of current capacities, causing an energy loss. Particularly, the SMPS with a high current capacity is a very expensive component, which considerably increases the manufacturing cost of the LED lighting system. Even though the SMPS module has been remarkably miniaturized and light-weighted, compared with the LED module which has been typically manufactured in much smaller size than the SMPS, it is still manufactured in bigger size than the LED module, resulting in limitations on the miniaturization and light-weight of the LED illuminating lamp.

Specifically, in the LED module applied to the outdoor LED advertising lamp, since a plurality of unit modules having LED elements is arranged in a row, it has a drawback in that the current capacity consumption of the SMPS is considerably increased.

Also, the above LED modules having independent unit modules includes two pieces of wire for connecting each LED elements, which are mounted on the unit module, in a row and other two pieces of wire for connecting each unit module itself in a row. That is, since four pieces of power wire are connected between the unit modules, a waste of the wire material can be generated, thereby increasing the cost of production.

Besides, in the conventional LED modules, since the plural LEDs are placed in a particular arrangement, an over current is often applied to the LEDs. That is, since the voltage and current outputted from the power supply is proportionate to the distance, the LEDs adjacent to the power supply is considerably overheated, so that the operation of the LED illuminating lamp is unstable and the life span of the LED is shortened.

In the meantime, since the LED modules applied to the sign etc. are always uniformly arranged on and fixed to the inside of the sign structure, it is difficult to optimally deal with an application purpose and structural situation thereof, or an angle for observing the sign. Specifically, because an angle of view of LED element itself (an emitting angle of light) is not large, there is a limit on improvement of the emitting efficiency of light.

In order to solve this problem, various constructions for adjusting the angle in the LED module have bee proposed. However, since a separating joint construction for adjusting the angle is added thereto, it is difficult to apply to the small channel sign owing to largeness of the size. Also, since the numbers of the joint construction for adjusting the angle are increased, the assembling works are inconvenient, thereby delaying the working time and deteriorating the productivity thereof. Besides, because the LED module capable of adjusting the angle is large in size and the number of parts is large, there is a problem in that the cost of production is increased.

Therefore, the present invention has been made in view of the above-mentioned problems, and the primary object of the present invention is to provide a LED lighting module using an AC power in that an inputted power source for driving a LED module having a plurality of unit modules is converted from the AC to the DC through a simplified rectifier circuit, thereby it can reduce manufacturing costs and miniaturize the dimension of a product through a simplified configuration to the exclusion of the SMPS. Also, the power source having a constant current is always applied to the LED module, thereby the operation of the LED module is always stable and the life span of the LED is increased.

A second object of the present invention is to provide a LED lighting module using an AC power in that it embodies a minimized construction capable of adjusting the emitting angle of light itself in view of an application purpose and structural situation thereof, or an angle for observing an abject (for example, a sign structure), in which the LED module is installed, so that the light can be efficiently emitted at a maximally enlarged angle and it can applied to a small channel sign through a miniaturized size thereof.

Technical Solution

In accordance with the present invention to achieve the objects thereof, there is provided a LED lighting module using an AC power comprising: a power supply for receiving an AC power source from outside for use as a driving source for a device; unit modules, with each unit module consisting of at least two LED sets connected together and each LED set consisting of one LED element or plural interconnected LED elements driven by an input power received from the power supply; and rectifier circuits, each being separately installed in first and last unit modules to which the power is input, for rectifying AC power which is input through the power supply when a multiplicity of unit modules form a loop, thereby allowing the AC power to serve as a drive power for the LED elements.

At this moment, the LED lighting module further comprises: a constant-current supply circuit installed between the rectifier circuit of the first unit module and the LED set, thereby allowing a constant current of the power source to be always supplied to the LED set when the rectified AC power is applied to the LED set.

Also, each unit module comprises a LED driving part which is a construction to drive the LED elements with a desired voltage by using the rectified power and is configured as a serial connection of the plurality of the LED elements and a resistance in response to the inputted power source. Specifically, each unit module comprises three pieces of wire having one piece of wire for connecting the LED driving part, which is formed at each unit module, in series through the divided rectifier circuit and two pieces of wire for supplying the AC power to the entire unit modules.

Simultaneously, a plurality of unit block circuits has at least two unit modules and one rectifier circuit and is electrically connected to each other in parallel, each unit block circuit receiving the AC power from a single power supply to constitute a single LED lighting product.

In accordance with the present invention to achieve the objects thereof, there is provided a LED lighting module using an AC power comprising: a mount having LED elements mounted and arranged thereon; a LED driving part for receiving an AC power source from outside and providing a desired voltage to each LED element so as to drive the LED elements; an angle adjusting part having an axis of rotation protruded from the mount so as to adjust an emitted light at various angles and a pivot loop mounted on a place of an installing surface corresponding to the axis of rotation of the mount so as to allow the axis of rotation to be inserted and rotated therein.

Here, the LED driving part comprises: unit modules, with each unit module consisting of at least two LED sets connected together and each LED set consisting of one LED element or plural interconnected LED elements driven by an input power received from a power supply; and rectifier circuits, each being separately installed in first and last unit modules to which the power is input, for rectifying AC power which is input through the power supply when a multiplicity of unit modules form a loop, thereby allowing the AC power to serve as a drive power for the LED elements.

Specifically, a plurality of unit block circuits has at least two unit modules and one rectifier circuit and is electrically connected to each other in parallel, each unit block circuit receiving the AC power from a single power supply to constitute a single LED lighting product and the unit modules and rectifier circuits are formed at a single mount or divisionally formed at the plural mounts.

At this moment, the LED lighting module further comprises an angle extension lens coupled to an end portion of the LED element and having an extension groove formed at an inside thereof so as to extend an emitting angle of light emitted from the LED element.

Here, the pivot loop has an inner circumference longer than a half length of an outer circumference of the axis of rotation and the remaining section of the inner circumference is made of an opened elastic body, thereby allowing the axis of rotation of the mount to be elastically inserted into the pivot loop.

Also, at least one latching protrusion is radially formed at the outer circumference of the axis of rotation and a plurality of latching grooves is formed at the inner circumference of the pivot loop, thereby allowing the mount to be rotated at a predetermined angle through the latching reaction thereof.

Simultaneously, the pivot loop has a rounded end portion extending to the opening portion so as to insert the axis of rotation therein.

Advantageous Effects

The present invention as described above has advantageous effects in that the inputted power can be converted and rectified from the AC to the DC through a simplified configuration to the exclusion of the SMPS. Moreover, the present invention with the simplified construction as the above has advantageous effects in that since the manufacturing costs are reduced and the dimension of the product is miniaturized, the sales efficiency can be facilitated by reduction of the sales cost of the product, and the application range of the product can be expanded due to the miniaturization of the product.

Particularly, the present invention has advantageous effects in that each unit module includes three pieces of wire constructed through a divided rectifier circuit so as to connect each unit module, thereby benefiting economically and manufacturing easily. Also, the power source having a constant current is always applied to the LED module through a constant-current supplying circuit part, thereby the operation of the LED module is always stable and the life span of the LED is increased.

Also, the present invention has advantageous effects in that an angle of view of LED element itself is extended and an emitting angle of light is adjusted, so that the light can be efficiently emitted at a maximally enlarged angle and the manufacturing costs are reduced and the dimension of the product is miniaturized, thereby the sales efficiency can be facilitated.

BRIEF DESCRIPTION OF THE DRAWINGS

The foregoing and other objects, features and advantages of the present invention will become more apparent from the following detailed description when taken in conjunction with the accompanying drawings in which.

BEST MODE

Mode for Invention

Hereinafter, exemplary embodiments of the present invention will be described in detail with reference to the accompanying drawings.

Figure 1:
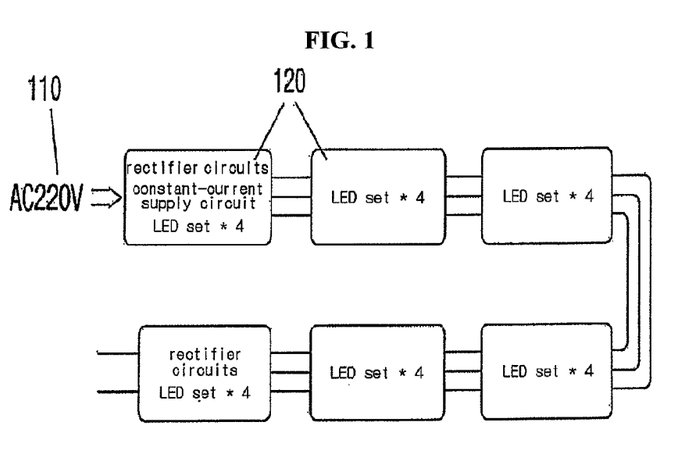
FIG. 1 is a block diagram illustrating a LED module in accordance with the present invention.
Figure 2:
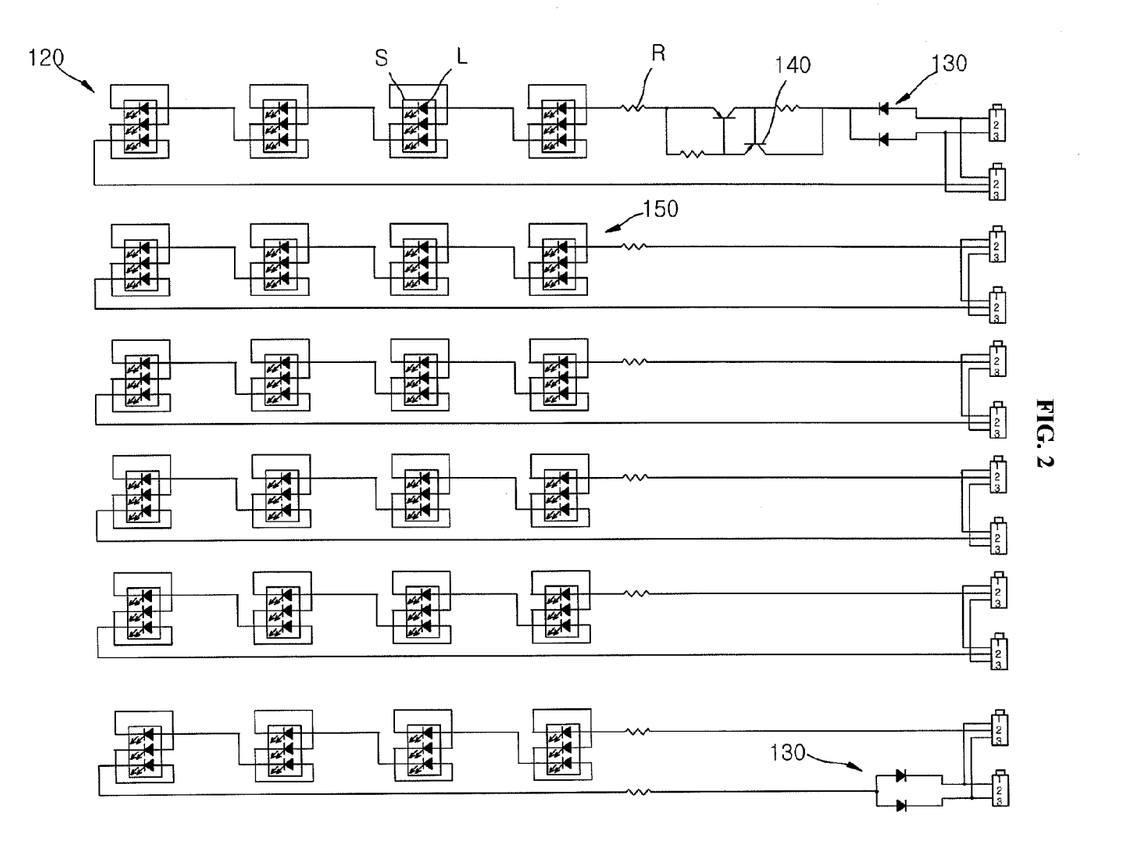
FIG. 2 is a circuit diagram illustrating the LED module in accordance with the present invention.

FIG. 1 is a block diagram illustrating a LED module in accordance with the present invention and FIG. 2 is a circuit diagram illustrating the LED module in accordance with the present invention.

Referring to the drawings, the LED lighting module using an AC power in accordance with the present invention includes a power supply 110, unit modules 120, rectifier circuits 130, and constant-current supply circuit 140. With the construction as the above, the power supply 110 is a construction for receiving an AC power source, which is a driving source for the illuminating device, from the outside. In this embodiment, the external AC power source has a voltage of 220V, a Korean Standard voltage, and the number of the LED elements (L) of the LED driving part 150 as described below is designated accordingly.

The unit modules 120 includes each unit module consisting of at least two LED sets (S) connected in series together and each LED set (S) consists of one LED element or plural interconnected LED elements driven by an input power received from the power supply 110.

As shown in FIG. 2, each LED set (S) consists of three LED elements (L) connected in series. The LED set (S) is connected together with a resistance (R) for generating a desired drop of electric pressure on the plural LED sets (S) to constitute the LED driving part 150. The LED driving part 150 is a construction to drive the LED elements (L) with a desired voltage by using the rectified power and is configured as a serial connection of a plurality of the LED elements (L) and a resistance (R) in response to the inputted power source.

In the drawings, the unit modules 120 includes each unit module 120 consisting of four LED sets (S) having three LED elements (L) and each LED set (S) is electrically connected to a single resistance (R). Six unit modules are connected to each other to constitute the entire LED module.

The rectifier circuits 130 are separately installed in first and last unit modules 120 to which the power is input. That is, the rectifier circuits 130 are configured as any shape of a bridge rectifier circuit when a multiplicity of unit modules forms a loop. Accordingly, the rectifier circuits 130 serve to rectify AC power, which is input through the power supply, thereby allowing the AC power to serve as a drive power for the LED elements. As shown in FIG. 2, the rectifier circuits 130 are constructed to install two diodes of the bridge rectifier circuit in the first unit module 120 and install the remaining two diodes in the last unit module 120.

The constant-current supply circuit 140 is installed between the rectifier circuit 130 of the first unit module 120 and the LED set (S).

The constant-current supply circuit 140 serves to always supply a constant current of the power source to the LED set (S) when the rectified AC power is applied to the LED set (S). The constant-current supply circuit 140 can be constructed by a transistor amplifier circuit as shown in FIG. 2. However, The constant-current supply circuit 140 may be an OP amplifier circuit or a regulator circuit and the like.

Preferably, The constant-current supply circuit 140 is a constant-current IC of one chip shape so as to more simplify the circuit construction.

Each unit module 120 includes three pieces of wire so as to drive a mutual LED driving part 150.

That is, the three pieces of wire includes one piece of wire for connecting the LED driving part 150, which is formed at each unit module 120, in series through the divided rectifier circuit 130 and two pieces of wire for supplying the AC power to the entire unit modules 120.

In the LED lighting module as the above, in order to convert an AC voltage of 220V into a driving power source of the LED elements (L) without using the SMPS, the operating conditions thereof is described below.

As shown in FIG. 2, twenty-four LED sets (S) have three LED elements (L) respectively and generate a drop of electric pressure on series connection of 223V by calculating 3.1V (LED driving voltage)×3×24. This means that the driving current of the LED elements (L) is controlled by using 77V obtained by subtracting 223V from 300V, which is a peak value of a power source of 220V power, a Korean Standard voltage.

Accordingly, by controlling the driving current of the LED elements (L), each unit module 120 can be constructed to have the entire LED elements of 2-100.

That is, as shown in FIG. 2, the constant-current supply circuit 140 and a part of the rectifier circuits 130 are constructed in the first unit module 120, the remaining rectifier circuit 130 is constructed in sixth unit module 120, and only LED driving parts 150 are second to fifth unit modules 120.

Figure 3:
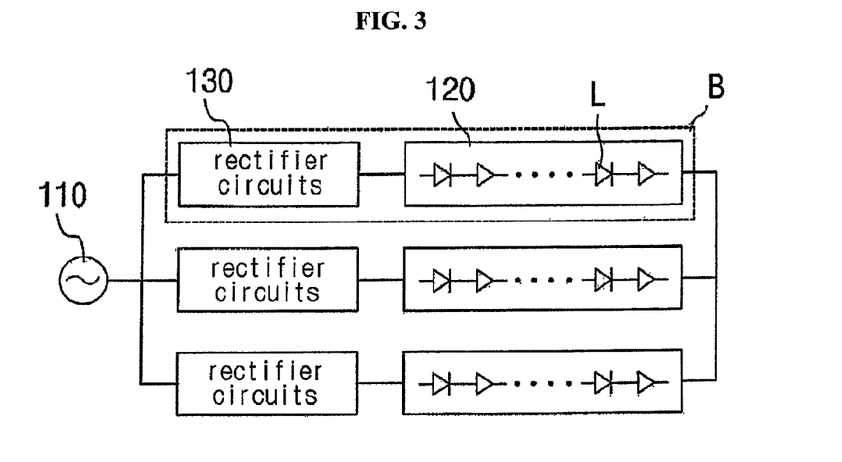
FIG. 3 is a circuit diagram illustrating a LED module having a plurality of unit block circuits in accordance with the present invention.

FIG. 3 is a circuit diagram illustrating a LED module having a plurality of unit block circuits in accordance with the present invention.

Referring to the drawings, the LED lighting module using an AC power in accordance with the present invention includes a plurality of unit block circuits (B) having at least two unit modules 120 and one rectifier circuit 130. The plurality of unit block circuits (B) is electrically connected to each other in parallel. Each unit block circuit (B) receives the AC power from a single power supply 110 to constitute a single LED lighting product.

Each unit block circuit (B) of the LED lighting module forms a closed loop capable of independently driving it through the inputted power. Where each unit block circuit (B) is applied to a sign lamp, an indoor lamp, an outdoor lamp or an interior lamp etc., as though parts of the unit block circuits (B) are out of order, other unit block circuits (B) can be normally operated.

Especially, when each unit block circuit (B) is applied to a module shape in LED lighting device, since only broken modules can be repaired or replaced, the maintenance can be easily conducted.

<Additional Embodiment>

Figure 4:
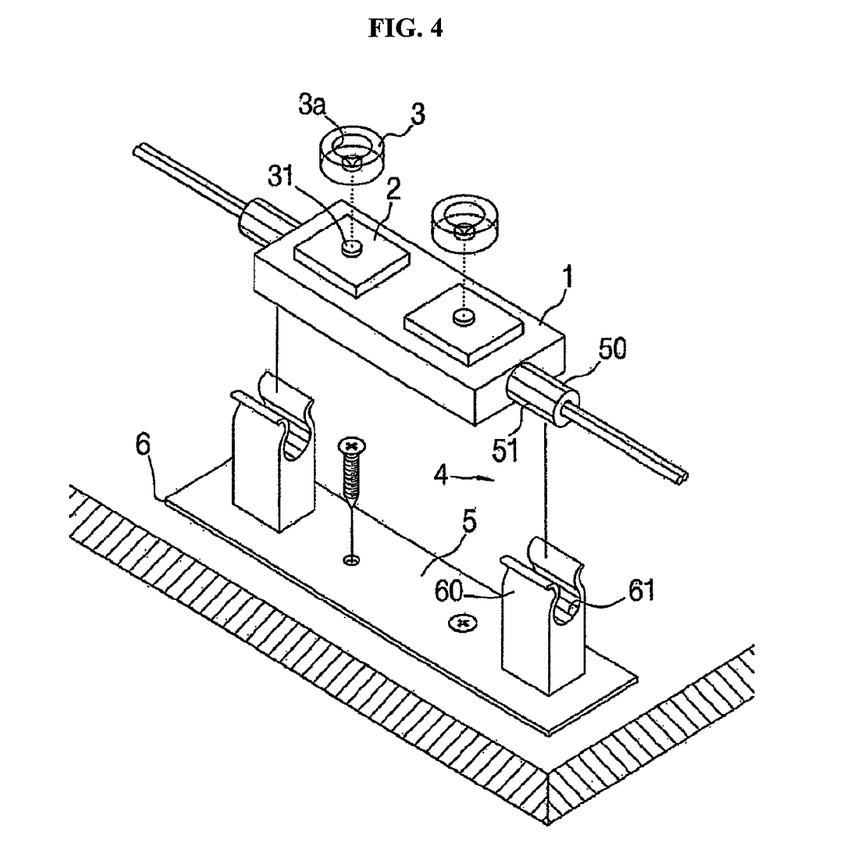
FIG. 4 is an exploded view illustrating a LED lighting module in accordance with an additional embodiment of the present invention.
Figure 5:
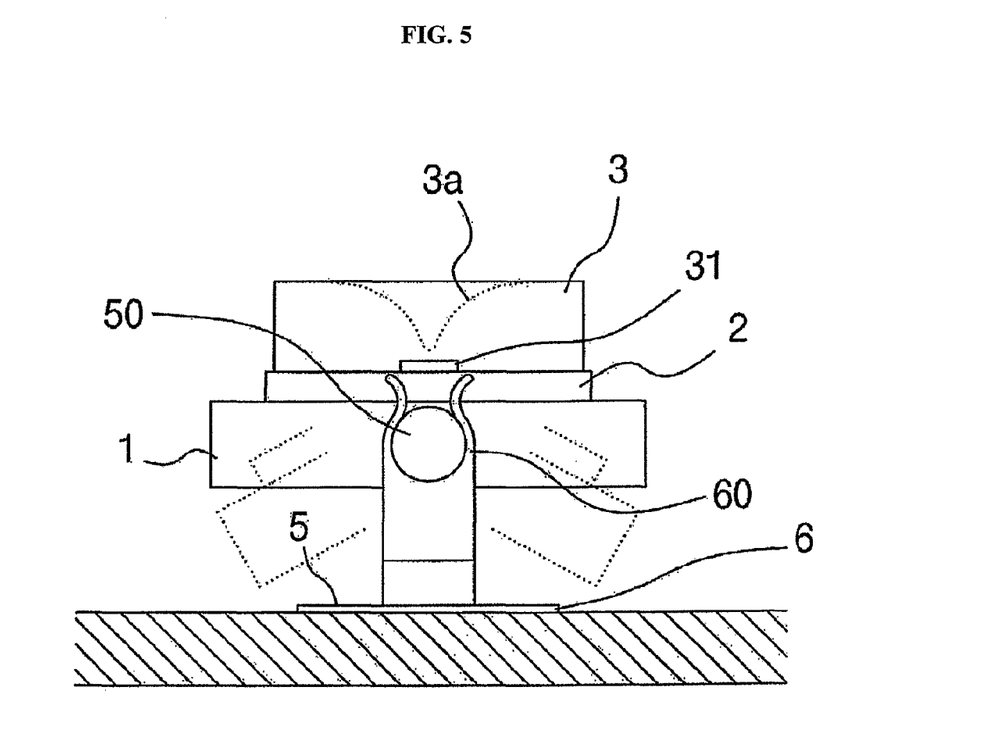
FIG. 5 is a side sectional view illustrating a LED lighting module in accordance with an additional embodiment of the present invention.

FIG. 4 is an exploded view illustrating a LED lighting module in accordance with an additional embodiment of the present invention and FIG. 5 is a side sectional view illustrating a LED lighting module in accordance with an additional embodiment of the present invention.

Referring to the drawings, the LED lighting module in accordance with the additional embodiment of the present invention presents a structural construction applied to a sign lamp etc. having the unit modules and rectifier circuits according to the first embodiment of the present invention.

The LED lighting module in accordance with the additional embodiment of the present invention has a basic construction including a mount 1, a LED driving part 2, an angle extension lens 3, and an angle adjusting part 4. The angle adjusting part 4 serves to connect the mount 1 to an installing surface 5. In the drawing, the installing surface 5 is an upper surface of a base 6.

Where the angle adjusting part 4 is mounted on the installing surface 5 of the base 6 of a plate shape, the base 6 is coupled to an inner surface of a channel sign, or a wall surface or bottom surface of a structure for implementing an interior through a screw or an adhesive and so on. Here, the base 6 can be excluded when the angle adjusting part 4 is directly mounted on the inner surface of a channel sign, or the wall surface or bottom surface of the structure.

The mount 1 of a plate shape includes LED elements 31 mounted on an upper surface thereof. Here, the flickering and luminance of the LED element 31 can be controlled by the LED driving part 2.

Here, the LED driving part 2 means the unit modules and rectifier circuits according to the first embodiment of the present invention. Also, the LED driving part 2 itself may be the unit block circuit (B) or the plurality of unit block circuits (B) electrically connected to each other in parallel.

The angle extension lens 3 serves to extend an emitting angle of light of the LED element 31. The angle extension lens 3 is coupled to an end portion of the LED element 31. The angle extension lens 3 includes an extension groove 3a of "V" shape formed at an inside thereof so as to extend the light emitted from the LED element 31 above horizontal angle to be outputted.

Here, the emitting angle of light is at least 180°-250°. The extended angle can be obtained by reflecting the light of the LED element 31 on the extension groove 3a of the angle extension lens 3.

Figure 6:
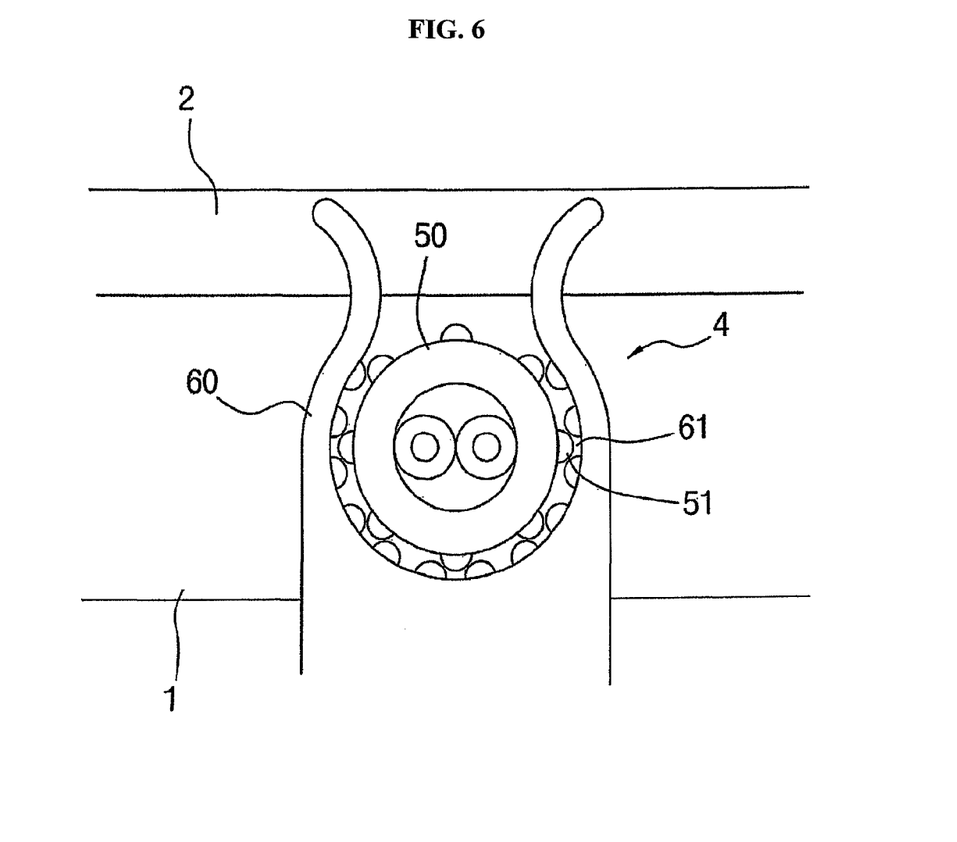
FIG. 6 is an enlarged sectional view illustrating the angle adjusting part in accordance with an additional embodiment of the present invention.

FIG. 6 is an enlarged sectional view illustrating the angle adjusting part 4 in accordance with an additional embodiment of the present invention.

Referring to the drawings, the angle adjusting part 4 includes an axis of rotation 50 formed at the mount 1 and a pivot loop 60 mounted on the installing surface 5 of the base 6.

The axis of rotation 50 is protruded from one side or both sides of the mount 1 so as to adjust the emitted light at various angles. Especially, the axis of rotation 50 is integrally injection-molded with the mount by using the same material. On the other hand, after the axis of rotation 50 is made of a high intensive material, the mount 1 is integrally injection-molded with the axis of rotation 50 so as to increase the intensity of the angle adjusting part 4.

The pivot loop 60 is mounted on a place of the installing surface 5 corresponding to the axis of rotation 50 of the mount 1. The pivot loop 60 has an inner circumference corresponding to an outer circumference of the axis of rotation 50 so as to rotate the inserted axis of rotation 50 therein.

Especially, the pivot loop 60 is open to one side of the inner circumference. That is, the pivot loop 60 has the inner circumference longer than a half length of the outer circumference of the axis of rotation 50 and the remaining section of the inner circumference is made of an elastic body. Therefore, the axis of rotation 50 of the mount 1 can be easily inserted into and mounted on the pivot loop 60 through the opening portion.

Also, the pivot loop 60 has a rounded end portion extending to the opening portion so as to insert the axis of rotation 50 therein. With this construction, where the axis of rotation 50 is inserted into the pivot loop 60 in the course of the working process of a narrow section such as the sign channel etc., the axis of rotation 50 can be easily mounted along the rounded end portion when the axis of rotation 50 arrives at a neighboring area of the pivot loop 60.

Additionally, the axis of rotation 50 and the pivot loop 60 includes a latching protrusion 51 and a latching groove 61 respectively. Here, the latching protrusion 51 and the latching groove 61 can be selectively formed at any one of the axis of rotation 50 and the pivot loop 60. In this embodiment of the present invention, the latching protrusion 51 is formed at the axis of rotation 50 and the latching groove 61 is formed at the pivot loop 60.

At least one latching protrusion 51 (eight latching protrusion in the drawing) is radially formed at the outer circumference of the axis of rotation 50 and the plurality of the latching groove 61 is formed at the inner circumference of the pivot loop 60.

With this construction, the axis of rotation 50 can be rotated at a predetermined angle through the latching reaction thereof, so that the light emitted from the LED element 31 arranged on the mount 1 can be irradiated at various angles.

In the construction as the above, the LED driving part 2 including the unit block circuit (B) having the unit modules 120 and rectifier circuits 130 can be formed at a single mount 1 or divisionally formed at the plural mounts 1. At this time, the mount 1 is coupled to the angle adjusting part 4.

That is, the unit block circuit (B) can be formed at one mount 1 at an one to one rate or the unit block circuit (B) can be formed at two mount 1 at an one to two rate. In other words, the unit block circuit (B) can be selectively formed according to a shape of LED lighting product and an installation requirement thereof.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A LED lighting module using an AC power mounted on an installation surface, comprising:
    a mount having two opposite side edges and a plurality of LED elements mounted thereon and arranged between said side edges;
    a LED driving part connected to said LED elements, for receiving an AC power source from outside and providing a desired voltage to each LED element so as to drive said LED elements;
    an angle adjusting part comprising an axis of rotation which protrudes outwardly from each of said side edges of said mount, so as to adjust the angle of light emitted from said LED elements, and at least one pivot loop mounted on the installation surface, said pivot loop being configured and dimensioned such that said axis of rotation is received and rotatable therein;

an angle extension lens, wherein said LED elements each have an end portion and said angle extension lens is coupled to said end portion of said LED element and said angle extension lens having an extension groove formed at an inside thereof so as to extend an emitting angle of light emitted from said LED element; and at least one latching protrusion radially formed on an outer circumference of said axis of rotation and a plurality of latching grooves formed on an inner circumference of said pivot loop, said at least one latching protrusion being engageable with said plurality of latching grooves thereby allowing said mount to be rotated at a predetermined angle through the latching reaction therebetween.

2. The LED lighting module as recited in claim 1, wherein said LED driving part comprises:

unit modules, with each of said unit modules consisting of at least two LED sets connected together and wherein each LED set comprises a member selected from the group consisting of one LED element and plural interconnected LED elements, driven by an input power received from a power supply; and rectifier circuits, each being separately installed in a first and a last unit module to which the power is input, for rectifying AC power which is input through said power supply when a multiplicity of unit modules form a loop, thereby allowing the AC power to serve as a drive power for said LED elements.

3. The LED lighting module as recited in claim 2, wherein:

said LED driving part comprises, a plurality of unit block circuits having at least two unit modules and one rectifier circuit and wherein said unit modules and rectifier circuits are electrically connected in parallel, each unit block circuit receiving the AC power from a single power supply to constitute a single LED lighting product and said unit modules and rectifier circuits are formed at a member selected from the group consisting of a single mount and divisionally formed at the plural mounts.

4. The LED lighting module as recited in claim 1, wherein:

said pivot loop has an inner circumference which is greater than half of the length of said outer circumference of said axis of rotation and wherein a remaining section of said inner circumference is made of an opened elastic body, thereby allowing said axis of rotation of said mount to be elastically inserted into said pivot loop.

5. The LED lighting module as recited in claim 1 wherein:

said pivot loop has an open portion and a rounded end portion extending to said open portion so as to permit said axis of rotation to be received within said pivot loop.

* * * * *